(12) United States Patent
Kriesels et al.

(10) Patent No.: US 9,677,179 B2
(45) Date of Patent: Jun. 13, 2017

(54) PIPE CONNECTOR AND METHOD

(71) Applicant: SHELL OIL COMPANY, Houston, TX (US)

(72) Inventors: Petrus Cornelis Kriesels, Rijswijk (NL); Egbert Jan Van Riet, Rijswijk (NL); Mark Michael Shuster, Voorburg (NL); Djurre Hans Zijsling, Rijswijk (NL)

(73) Assignee: SHELL OIL COMPANY, Houston, TX (US)

( * ) Notice: Subject to any disclaimer, the term of this patent is extended or adjusted under 35 U.S.C. 154(b) by 56 days.

(21) Appl. No.: 14/653,398

(22) PCT Filed: Dec. 17, 2013

(86) PCT No.: PCT/EP2013/076868
§ 371 (c)(1),
(2) Date: Jun. 18, 2015

(87) PCT Pub. No.: WO2014/095836
PCT Pub. Date: Jun. 26, 2014

(65) Prior Publication Data
US 2016/0186332 A1 Jun. 30, 2016

(30) Foreign Application Priority Data

Dec. 20, 2012 (EP) .................... 12198537

(51) Int. Cl.
C23C 24/10 (2006.01)
C25D 15/00 (2006.01)
(Continued)

(52) U.S. Cl.
CPC .............. *C23C 24/106* (2013.01); *C23C 4/18* (2013.01); *C25D 5/505* (2013.01); *C25D 7/04* (2013.01);
(Continued)

(58) Field of Classification Search
CPC ........... C23C 24/10; C23C 4/18; C25D 15/00; C25D 5/50; C25D 5/505; C25D 7/04; F16B 33/06; E21B 17/042
(Continued)

(56) References Cited

U.S. PATENT DOCUMENTS 1,859,311 A   5/1932   McEvoy, Jr.
1,875,708 A   9/1932   Couhig
(Continued)

FOREIGN PATENT DOCUMENTS

CH       557499       12/1974
CN     101722403       6/2010
(Continued)

OTHER PUBLICATIONS

PCT International Search Report, Application No. PCT/EP2013/053501 dated Aug. 16, 2013.
(Continued)

*Primary Examiner* — Samuel M Heinrich

(57) ABSTRACT

A method is provided of creating a pipe connector including a first connector member and a second connector member, said connector members being adapted to be connected and disconnected multiple times, the method comprising: a) providing at least one of the connector members with a contact surface; b) depositing particles of a galling resistant metal on each said contact surface; c) at least partially melting the particles of the galling resistant metal by subjecting the particles to a quantity of heat; and d) allowing the molten galling resistant metal to solidify thereby forming a galling resistant metal coating which is metallurgically bonded to the contact surface. The heat may be provided in the form of radiant energy, using a laser beam.

21 Claims, 4 Drawing Sheets

(51) Int. Cl.
*F16B 33/06* (2006.01)
*C25D 5/50* (2006.01)
*E21B 17/042* (2006.01)
*C23C 4/18* (2006.01)
*C25D 7/04* (2006.01)

(52) U.S. Cl.
CPC ............ *C25D 15/00* (2013.01); *E21B 17/042* (2013.01); *F16B 33/06* (2013.01)

(58) Field of Classification Search
USPC .............. 219/121.66; 285/422; 427/553–556
See application file for complete search history.

(56) References Cited

U.S. PATENT DOCUMENTS

| | | | |
|---|---|---|---|
| 2,127,943 A | | 8/1938 | Stone |
| 2,136,458 A | | 11/1938 | Olson |
| 2,140,467 A | | 12/1938 | Cargile |
| 2,539,056 A | | 1/1951 | Brown |
| 3,822,902 A | | 7/1974 | Maurer et al. |
| 4,468,309 A | * | 8/1984 | White ..................... C23C 14/32 204/192.15 |
| 4,630,849 A | * | 12/1986 | Fukui ..................... E21B 17/042 285/333 |
| 4,688,832 A | | 8/1987 | Ortloff et al. |
| 4,871,194 A | * | 10/1989 | Kawashima .......... E21B 17/042 285/329 |
| 4,962,579 A | | 10/1990 | Moyer et al. |
| 5,212,885 A | | 5/1993 | Buonodono et al. |
| 5,398,975 A | | 3/1995 | Simmons |
| 5,895,079 A | * | 4/1999 | Carstensen ............. F16L 47/16 285/148.13 |
| 6,047,997 A | | 4/2000 | Olivier |
| 6,349,739 B1 | | 2/2002 | Burgoni et al. |
| 6,417,147 B2 | | 7/2002 | Amemiya et al. |
| 6,514,631 B1 | | 2/2003 | Yamamoto et al. |
| 6,746,057 B2 | | 6/2004 | Goto et al. |
| 6,860,420 B2 | | 3/2005 | Filippov et al. |
| 7,107,663 B2 | | 9/2006 | Ellington et al. |
| 7,571,936 B2 | | 8/2009 | Schneider et al. |
| 7,900,968 B2 | | 3/2011 | Camwell et al. |
| 8,042,841 B2 | | 10/2011 | Viegener |
| 8,205,680 B2 | | 6/2012 | Cook et al. |
| 8,857,857 B2 | * | 10/2014 | Goto ................... C10M 169/041 285/333 |
| 9,194,515 B2 | | 11/2015 | Oshima et al. |
| 9,290,714 B2 | * | 3/2016 | Pinel .................... C10M 103/06 |
| 2002/0014514 A1 | | 2/2002 | Shimizu et al. |
| 2003/0047588 A1 | | 3/2003 | Filippov et al. |
| 2003/0168858 A1 | | 9/2003 | Hashem |
| 2004/0033122 A1 | | 2/2004 | Hill |
| 2004/0130152 A1 | | 7/2004 | DeLange et al. |
| 2004/0195826 A1 | | 10/2004 | Goto |
| 2005/0093250 A1 | | 5/2005 | Santi et al. |
| 2007/0170722 A1 | | 7/2007 | Reynolds, Jr. et al. |
| 2010/0173172 A1 | | 7/2010 | Killian et al. |
| 2013/0220636 A1 | | 8/2013 | Drenth et al. |
| 2015/0014989 A1 | | 1/2015 | Zijsling et al. |
| 2015/0035274 A1 | | 2/2015 | Zijsling et al. |

FOREIGN PATENT DOCUMENTS

| | | |
|---|---|---|
| GB | 465538 | 5/1937 |
| GB | 2394236 | 4/2004 |
| JP | 11062939 | 5/1999 |
| WO | 2004005665 | 1/2004 |
| WO | 2005071212 | 8/2005 |
| WO | 2010083097 | 7/2010 |
| WO | 2012032116 | 3/2012 |
| WO | 2012076651 | 6/2012 |
| WO | 2012095422 | 7/2012 |
| WO | 2012156230 | 11/2012 |
| WO | 2013117754 | 8/2013 |

OTHER PUBLICATIONS

PCT International Search Report, Application No. PCT/EP2013/076868 dated Mar. 4, 2014.
PCT International Search Report, Application No. PCT/EP2013/053502 dated Aug. 16, 2013.

* cited by examiner

PIPE CONNECTOR AND METHOD

CROSS-REFERENCE TO RELATED APPLICATIONS

The present application is a National Stage (§371) of International Application No. PCT/EP2013/076868, filed Dec. 17, 2013, which claims priority from European Application No. 12198537.8, filed Dec. 20, 2012, the disclosures of each of which are hereby incorporated by reference in their entirety.

The present invention relates to a method of creating a pipe connector including a first connector member and a second connector member. The first and second connector members can be, for example, a pin member and a box member, wherein the pin member has a threaded outer surface and the box member has a corresponding threaded inner surface to allow the pin member to be screwed into the box member to form a screwed joint.

Pipe connectors of this type are generally used in oilfield applications, for instance to connect sections of casing or production tubing. Often, oilfield applications require the connectors to provide liquid tight and/or gas-tight sealing. Also, the connectors preferably have a strength approximately equal to the body strength of the pipe sections to be connected by the connectors.

Commonly used connectors are API (American Petroleum Institute) connectors, which include several types of threaded connectors. API connectors conform to specifications as set by the American Petroleum Institute. API connectors generally provide satisfactory performance at relatively low cost. However these connectors may lack reliable fluid-tightness, for example in applications involving high pressure, high temperature or deep wellbores. In such difficult applications, premium connectors can be applied which provide enhanced performance but are also more expensive.

An important qualification requirement for a premium connector is the ability to be made-up and broken-out at least three times without diminished sealing capability. One problem to be overcome in designing a premium connector is the phenomenon of galling ('cold welding') of the contact surfaces. Due to the stringent sealing requirements for a premium connector, the contact surfaces of the pin and box members slide along each other at high compressive stress during make-up and break-out. This may lead to galling of the contact surfaces which results in significant damage.

U.S. Pat. No. 4,468,309 discloses a method of resisting galling of threaded members of a connector whereby a material film is deposited by high energy ion plating of at least one member for providing a thin mechanically insulating film on the metal-to-metal surfaces having a low shear stress value in order to separate the metal-to-metal surfaces from each other for preventing galling.

It is a drawback of the known method that the high energy ion plating process occurs in a vacuum chamber, which is impractical for use with oilfield tubulars. Furthermore, there is a need to provide a pipe connector that can be made-up and broken-out multiple times without the occurrence of galling and without diminished fluid-tightness.

It is an object of the invention to provide an improved method of creating a pipe connector which overcomes the drawbacks of the prior art.

In accordance with the invention there is provided a method of creating a pipe connector including a first connector member and a second connector member, said connector members being adapted to be connected and disconnected multiple times, the method comprising:

a) providing at least one of the connector members with a contact surface;

b) depositing particles of a galling resistant metal on each said contact surface;

c) at least partially melting the particles of the galling resistant metal by subjecting the particles to a quantity of heat; and d) allowing the molten galling resistant metal to solidify thereby forming a galling resistant metal coating which is metallurgically bonded to the contact surface.

In applications whereby the particles are only partially melted the process may be referred to as 'sintering'.

The invention also relates to a pipe connector obtained with the method of the invention.

By melting or sintering the galling resistant metal on each contact surface followed by solidification of the molten metal, it is achieved that a metallurgical bonding between the galling resistant metal coating and the base metal of the contact surface is obtained. In view thereof higher contact stresses can be allowed between the connector members than in the prior art, and therefore the design of the connector members can be optimised whereby the contact stresses are less of a limiting factor. Moreover, an inherent advantage of higher contact stresses between the ductile metal surfaces of the connector members relates to improved sealing capability between the connector members due to plastic deformation of local asperities at the ductile metal surfaces. Furthermore the molten metal spreads along the contact surface so that after solidification of the metal, the coating has a smooth surface.

In order to effectively melt or sinter the galling resistant metal without affecting the microstructure of the underlying base metal, suitably said quantity of heat is provided in the form of radiant energy.

The heat may be particularly focused to the galling resistant metal if said quantity of radiant energy is induced by a laser beam. In this way metallurgical bonding of the coating is achieved without deep penetration of heat into the base metal and without undesired microstructure changes of the base metal. The process of laser treatment may provide fully melted or just sintered metal. In the latter case the coating will have some residual porosity which can be an additional source of ductility thereby providing enhanced sealing during assembly of the connector members.

The laser beam may comprise a point laser beam. In such application, the point laser beam can be moved relative to the contact surface so as to cover the entire contact surface. For example, if the contact surface extends in circumferential direction of the connector member, such movement can be achieved by fast rotation of the connector member relative to the point laser beam. Alternatively, the connector member may be moved relative to the laser beam.

To achieve a uniform distribution of the radiant energy across the contact surface with galling resistant metal, suitably the laser beam comprises a linear laser beam. A linear laser beam herein implies a laser beam that provides not only a dot of light but rather a line on the contact surface. In other words, the laser beam provides a two-dimensional line on the work piece (e.g. the connector member) as opposed to the usual one-dimensional point of light as typically provided by a laser beam. Patent application WO-2012/032116-A1 discloses an example of an apparatus for generating a linear laser beam.

In an embodiment of the method of the invention, the connector member has a central longitudinal axis and the contact surface is of substantially circular cross-sectional shape, and wherein one of the connector member and the laser beam is rotated relative to the other of the connector member and the laser beam about said central longitudinal axis during step (c). Also, the linear laser beam can be provided to have a circular cross-sectional shape whereby the laser beam radiates along a circular line on the contact surface. In that case the linear laser beam can be translated in axial direction of the connector member while no relative rotation between the connector member and the laser beam is needed.

In a further embodiment, said at least one connector member is integrally formed with a pipe and said metal is corrosion resistant, wherein the method further comprises depositing said particles on the inner surface of the pipe, at least partially melting the particles on said inner surface by subjecting the particles to the laser beam, and allowing the molten metal on said inner surface to solidify so as to form a corrosion resistant metal coating bonded to the inner surface of the pipe. Suitably the galling resistant metal coating on the contact surface extends continuously to the corrosion resistant metal coating on the inner surface of the pipe. In this manner the galling resistant coating on the contact surface and the corrosion resistant coating on the inner surface are formed as a single, continuous layer.

A selected one of the connector members can be provided with said galling resistant coating which is arranged so as to contact the base metal of the other connector member when the connector members are interconnected, wherein said galling resistant coating and said base metal have tribological compatible contact surfaces. Herein the term 'base metal' refers to the metal the connector member is made of, excluding the coating(s). For example, if the connector members include one or more pin members and a box member, said selected connector member suitably is the box member. This would be particularly attractive for coupled connections whereby two pipe sections are provided with respective pin members that are inserted into a box member at opposite ends thereof. Such box member is also referred to as 'coupling'. Only the coupling would have to be provided with the coating, which simplifies logistics.

For enhanced galling resistance, suitably a first said galling resistant coating is provided to the first connector member and a second said galling resistant coating is provided to the second connector member, the first and second coatings being in contact with each other when the connector members are interconnected, and wherein the first and second coatings have tribological compatible contact surfaces.

Enhanced tribological compatibility of the coating surfaces is achieved if the hardness of the first galling resistant coating differs from the hardness of the second galling resistant coating. During make-up the softer coating will plastically deform to fill up the micro-asperities at the surface of the harder coating which improves the sealing performance of the connector.

For example, adequate tribological compatibility between the coatings is achieved if the first galling resistant metal comprises Inconel 625 (trade mark) and the second galling resistant metal comprises Hastelloy C 276 (trade mark).

It was found that enhanced resistance against galling is achieved if each coating of galling resistant metal has a positive hardness gradient in the depth direction of the coating. Herein the coating hardness increases with depth into the coating layer, typically from the outer surface of the coating towards the base metal of the connector member. This may be explained by considering that after cold welding of local asperities at the contact surfaces, continued relative sliding of the contact surfaces leads to shearing-off of material with lowest hardness which is at the contact surface rather than deeper into the coating. Substantial damage to the coating is thereby prevented.

Such positive hardness gradient can be accomplished by a combination of optimum powder (i.e. metal particles) composition and energy source such as a linear laser. Since the linear laser beam can be precisely focused on the surface of the coating layer, the metal deeper into the coating layer is less affected by the heat from the laser than the metal at the surface of the coating layer, and therefore retains higher hardness than the metal at the surface of the coating layer. Suitably step (b) comprises depositing the particles of galling resistant metal on the contact surface by a method selected from thermal spraying, electroplating, brushing, and dipping the contact surface into the galling resistant metal. The thermal spraying method may be, for example, plasma spraying or high velocity oxy-fuel coating spraying (HVOF).

The galling resistant metal advantageously comprises a corrosion resistant alloy.

The invention will be described in more detail and by way of example with reference to the accompanying schematic drawings in which:

FIG. 2b shows detail A of FIG. 2a;

Figure 1A:
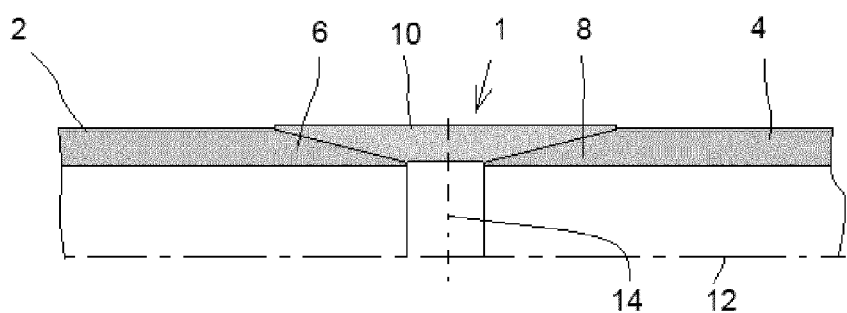
FIG. 1a shows, in longitudinal section, an embodiment of a pipe connector obtained with the method of the invention.
Figures 4A, 4C:
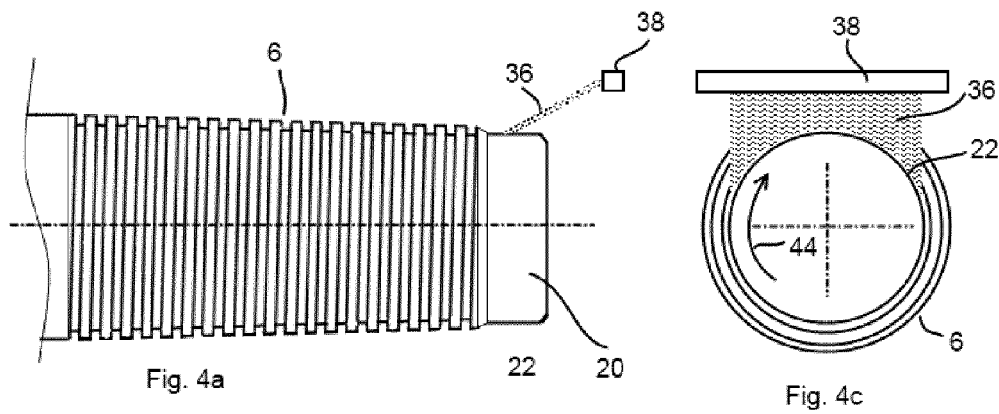
Figure 4B:
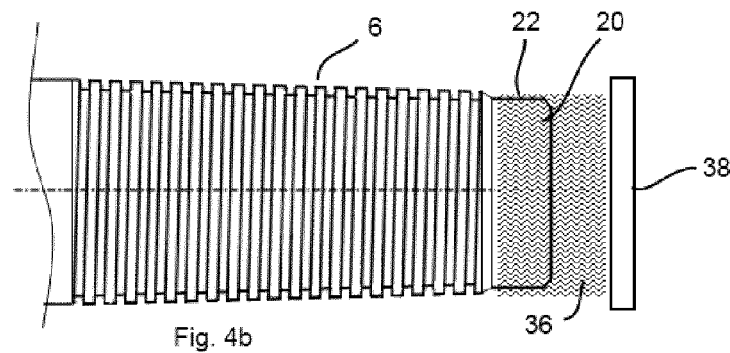
Figures 5A, 5B:
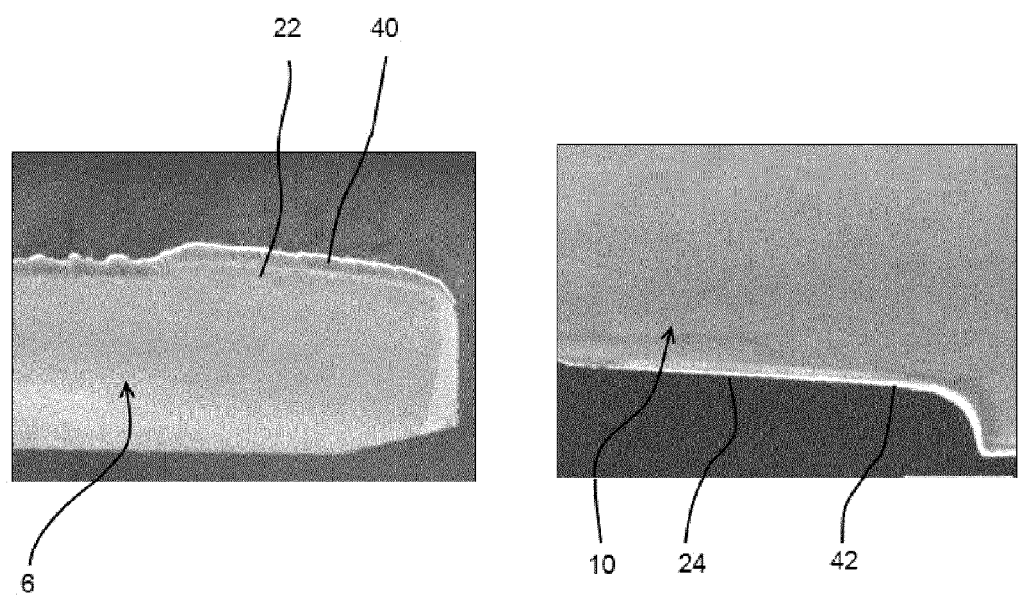

FIGS. 3a-d show various stages during local galling of two contact surfaces;

FIG. 4a shows a side view of a pin member of the connector of FIG. 1a during melting of galling resistant metal;

FIG. 4b shows a top view of the pin member during melting of galling resistant metal;

FIG. 4c shows an end view of the pin member during melting of galling resistant metal;

FIG. 5a shows, in longitudinal section, a portion of the box member provided with a galling resistant coating; and FIG. 5b shows, in longitudinal section, a portion of the pin member provided with a galling resistant coating.

In the figures and the detailed description, like reference signs relate to like components.

FIGS. 1a,b show, in longitudinal section, a tubular pipe connector 1 interconnecting a first pipe 2 and a second pipe 4 (FIG. 1a). The pipe connector 1 comprises a first pin member 6 integrally formed with the first pipe 2, a second pin member 8 integrally formed with the second pipe 4, and a box member 10. Reference numeral 12 represents a central longitudinal axis of the pipe connector 1. The pipe connector is symmetrical relative to a transverse plane 14 represented here by dotted line 14. For ease of reference only the portion of the pipe connector left of the transverse plane 14 will be described, the other portion being identical albeit symmetrical thereto.

Figure 1B:
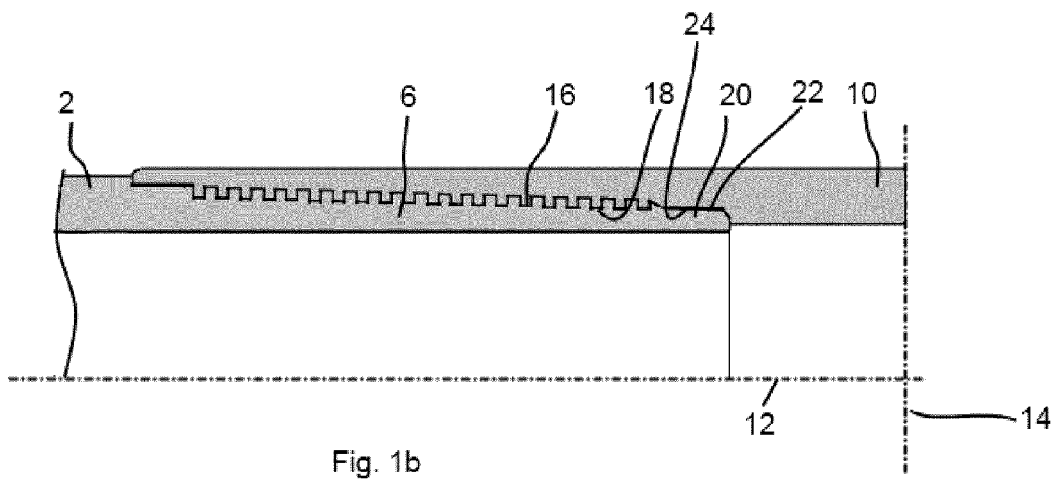
FIG. 1b shows a portion of the pipe connector of FIG. 1a in more detail.

As shown in more detail in FIG. 1b, the pin member 6 has a threaded outer surface 16 and the box member 10 has a threaded inner surface 18, whereby the respective threads of the threaded surfaces 16, 18 correspond to each other so as to allow the pin member 6 to be screwed into the box member 10. The threaded outer surface 16 of the pin member tapers from a relatively large diameter to a relatively small diameter and the threaded inner surface 18 of the box member tapers in corresponding manner.

The pin member 6 has an end portion 20 with an outer contact surface 22 which tapers slightly radially inward in axial direction toward the end of the pin member 6. The box member 10 is provided with a corresponding inner contact surface 24 that is in sealing contact with the outer contact surface 22 when the pin member 6 and the box member 10 are interconnected.

Figure 2A:
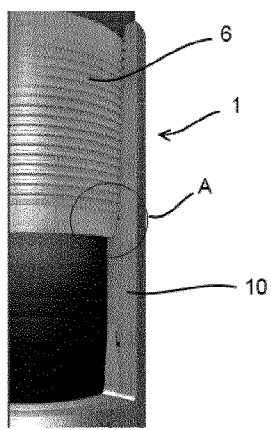
FIG. 2a shows a perspective view of the connector of FIG. 1a with the box member partially cut away.
Figure 2B:
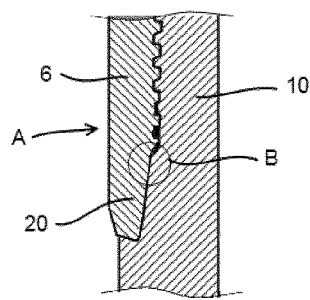
Figure 2C:
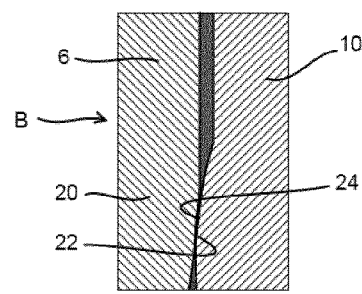
FIG. 2c shows detail B of FIG. 2b.

FIGS. 2*a-c* show the pipe connector 1 with the pin member 6 connected to the box member 10 whereby the box member 10 is partially cut away. FIG. 2*b* shows detail A indicating the end portion 20 of the pin member 6, and FIG. 2*c* shows detail B indicating the outer contact surface 22 of the pin member 6 in sealing contact with the inner contact surface 24 of the box member 10.

Figure 3A:
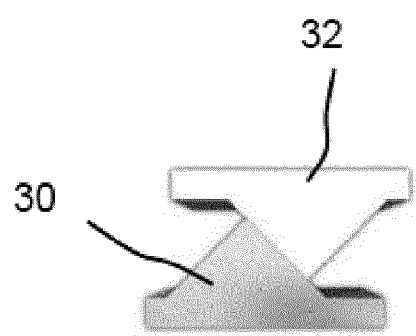
Figure 3B:
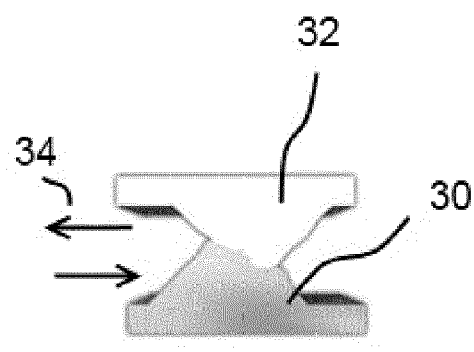
Figure 3C:
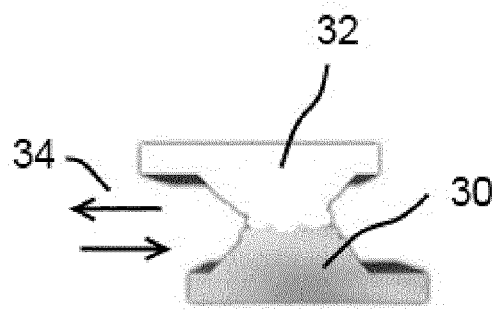
Figure 3D:
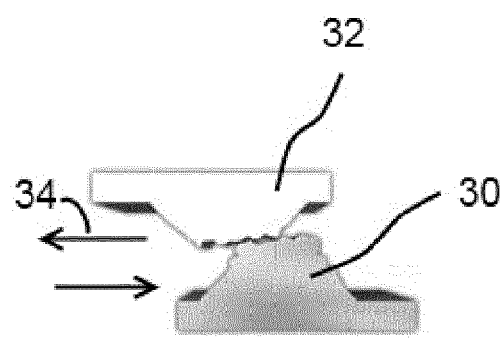

FIGS. 3*a-d* schematically show various stages of the mechanism of local galling of two contact surfaces at a microscopic scale. After initial contact between two irregularities 30, 32 of the surfaces (FIG. 3*a*) relative sliding movement of the contact surfaces, indicated by reference sign 34, leads to plastic deformation of the irregularities 30, 32 (FIG. 3*b*). Continued relative movement induces high compressive stresses between the irregularities 30, 32 thus leading to cold welding of the irregularities. Upon further relative movement, the welded irregularities 30, 32 are sheared off the contact surfaces which implies that small portions of material are transferred from one contact surface to the other, thus leading to local damage of the contact surfaces.

FIGS. 4*a-c* respectively show a side view (FIG. 4*a*), a top view (FIG. 4*b*) and an end view (FIG. 4*c*) of the pin member 6 whereby the contact surface 22 is subjected to a linear laser beam 36 emitted by a laser apparatus 38. The linear laser beam 36 induces a laser line as opposed to the more general laser point, and has sufficient energy to induce melting of the galling resistant metal on the contact surface 22.

FIGS. 5*a, b* show the end portion 20 of the pin member 6, whereby the outer contact surface 22 has been provided with a galling resistant coating 40 in accordance with the method of the invention (FIG. 5*a*). Similarly, the inner contact surface 24 of the box member 10 has been provided with a galling resistant coating 42 in accordance with the method of the invention (FIG. 5*b*). Each coating 40, 42 has a thickness of about 10-1000 μm, preferably between 50-100 μm.

During normal operation with the method of the invention, the pin and box members 6, 10 are machined in conventional manner whereby the pin member is provided with the threaded outer surface 16 and the outer contact surface 22, and the box member 10 is provided with the threaded inner surface 18 and the inner contact surface 24. The contact surfaces 22, 24 are to be machined to a diameter such that the pin member 6 and the box member 10 can be adequately interconnected when the galling resistant coatings 40, 42 is provided to the respective contact surfaces. Thus, depending on geometrical characteristics, it may be required to machine the outer contact surface 22 to a slightly smaller diameter than conventionally, i.e. if coating 40 is absent. Similarly it may be required to machine the inner contact surface 22 to a slightly larger diameter than conventionally.

In a next step, the contact surfaces 22, 24 are thoroughly cleaned and particles of galling resistant metal are applied to the contact surface 22, 24. This can be done in any suitable manner provided the metal particles adhere to the respective contact surfaces. For example, the particles can be applied by thermal spraying, electroplating, or brushing. Also the galling resistant metal can be applied to the contact surfaces using a spatula or by dipping the contact surfaces into the galling resistant metal. Various suitable galling resistant metals can be used for the particles. In the present example, the metal of the particles applied to one of the contact surfaces is Inconel 625 (trade mark), and the metal of the particles applied to the other contact surface is Hastelloy C 276. It has been found that these materials show adequate galling resistant performance when in sliding contact with each other.

In a subsequent step the contact surface 22 with the galling resistant metal is subjected to the linear laser beam 36 emitted by laser apparatus 38. Simultaneously the pin member is rotated about its central longitudinal axis 12, as illustrated by reference sign 44. The galling resistant metal along the entire circumference of the contact surface 22 is thereby subjected to the linear laser beam. The high radiation energy of the laser beam causes melting of the galling resistant metal whereby the molten galling resistant metal flows along the contact surface 22 to form a uniform layer of molten galling resistant metal. The linear laser beam is focussed on the galling resistant metal, without causing significant metallurgical changes in the base metal of the pin member 6 below the contact surface 22.

The metal particles on the contact surface 24 of the box member 10 are molten in similar manner, whereby the linear laser beam is directed to the contact surface 24 and the box member 10 is rotated simultaneously about its central longitudinal axis.

In a further step, the laser apparatus 38 is deactivated to allow the molten galling resistant to solidify so as to form the respective galling resistant coatings 40, 42. In view of the intensive contact between the molten galling resistant metal with the underlying contact surfaces 22, 24, a metallurgical bond occurs between the coatings 40, 42 and the respective contact surfaces 22, 24. Furthermore, since the galling resistant metal is allowed to flow along the contact surfaces when in molten stage, each coating 40, 42 is of uniform thickness and has a very smooth outer surface.

Thereafter the pin member 6 and the box member 10 are interconnected whereby the threaded surfaces 16, 18 engage and whereby the galling resistant coatings 40, 42 slide along each other without any significant galling. After the pin and box members 6, 10 have been assembled, the galling resistant coatings 40, 42 are in sealing contact with each other.

In this manner it is achieved that the pipe connector can be made-up and broken-out multiple times without the occurrence of galling of the contact surfaces, therefore carbon steel can be used for the base material of the connector rather than a high grade steel. Consequently the costs of the connector are significantly reduced compared to prior art premium connectors. Furthermore, the coating applied on the contact surface(s) of a connection cut on a carbon steel tubular provides the connection with corrosion resistant properties.

Instead of providing each contact surface with a single galling resistant coating, multiple galling resistant coatings can be provided on the contact surface whereby the various coatings are arranged on top of each other. For example, a first top coating can be applied to provide maximum ductility, a second coating for superior sealing properties, and a third coating—bonded to the base metal of the connector member—for improved stress distribution in the base metal.

In a practical embodiment, thickness of the coating layer is in the order of 20 μm to 2 mm. Thickness of the coating is preferably in the order of 100 to 300 μm. The galling resistant coating may have a hardness in the range of 100 to 1200 HV(120 kg). Hardness of the coating may for instance be above 200 HV and/or below 600 HV. Hardness gradient of the coating may increase from its outer surface towards the base metal of the connector member (e.g. pin or box). The hardness may for instance increase in the order of 10 to 25% from the hardness value at its outer surface compared to the hardness value near the base metal.

In an exemplary embodiment, an unthreaded first contact surface on the first connector member was provided with a first coating comprising Hastelloy C 276. Hardness of the first coating was about 248 HV. Thickness of the first coating was about 20 to 50 μm.

A corresponding unthreaded second contact surface on the second connector member may be provided with a second coating. Said second coating may have multiple layers, wherein each layer having an increasing hardness in the comprising Inconel 625. Hardness of the second coating was about 400-450 HV at the surface. Hardness of the second coating was about 500-550 HV near the base metal of the connector member. Thickness of the second coating, in total was about 300 μm. Thickness of the softer surface layer of the second coating was about 60 to 70 μm. The hardness (Vickers Hardness) near the base metal was about 15% more than the hardness at the outer surface of the coating.

The connector was able to withstand at least 10 times making up the connector and breaking it apart again.

Thus, with the method of the invention a premium threaded connector is provided of which the mating surfaces of pin and box members are provided with a metallic coating which is bonded to the base material by a laser melting or sintering technology. This technology enables a wide range of metallic coatings to be applied with different chemical composition, mechanical and tribological properties. The coating can be applied to the contact surfaces forming the metal-to-metal seal and/or the threaded section(s) of the pin member and/or the box member.

For instance, the threaded sections of the pin and box of a relatively inexpensive threaded API connection may be provided with corresponding unthreaded sealing sections. Such sealing sections may be machined for instance at one or both ends of the threaded section. One or both of said contact surfaces may subsequently be provided with a coating, using the method according to the present invention. The resulting connector may provide fluid tightness, and preferably also gas tightness, comparable to a premium connector, while still being relatively inexpensive.

If the galling resistant coating is provided to the sealing section of the connector member(s), the sealing section can be designed for a higher interference pressure resulting in improved sealing performance. Such sealing section can have a minimal length and reduced thickness of the sealing lip of the pin member and box member. This enables the critical cross-sectional area of the connector to be increased so that the mechanical performance properties are enhanced. Also the galling resistant coating can be provided to the threaded section of each connector member. This allows the threaded section to be designed for improved mechanical performance and for increased contact stresses thus enabling a reduction of e.g. thread height and consequently an increase of the critical cross-section of the connector. A further improvement is achieved if the metallic coating has lubricating properties to minimize or eliminate the use of dope during make-up. This has HSE advantages and avoids problems associated with over-doping of connectors. Furthermore, if the galling resistant coating is provided to the sealing section of the connector member(s), the sealing section can be designed to deform plastically during the first make-up of the connector members. The sealing section can be, for example, a sealing lip of the pin member or the box member. This enables the interference pressure in the sealing section to be accurately controlled as it is governed by the yield strength of the base material of the sealing section. In addition this enables the manufacturing tolerances of the sealing areas of the connection to be relaxed and thus costs to be reduced.

Suitable galling resistant metals or metal alloys for use in the method of the invention are listed in the following table (wherein all products are referred to by their Trade Mark names):

| Metallic base | Product |
| --- | --- |
| Nickel base | Diamalloy; Hastelloy; Inconel |
| Cobalt base | Tribolloy, ULTIMET |
| Molybdenum base | Metco; AMDRY |
| Tungsten carbide base | WOKA |

Some of the best test results were obtained with the following specific compositions (Trade Mark names):

| Metallic base | Product |
| --- | --- |
| Nickel base | Diamalloy 1005; Hastelloy C276; Inconel 625 |
| Cobalt base | Tribolloy 400, 800, 45 CNS, ULTIMET |
| Molybdenum base | Metco 63NS; AMDRY 313X |
| Tungsten carbide base | WOKA 7203, 7207, 6352 |

It was found that metals with nickel base chemistry provide best anti-corrosive performance, metals with cobalt and molybdenum base provide best galling resistance, and tungsten carbide base coatings provide highest hardness and corresponding sliding wear resistance.

Materials of different coatings were tested for galling resistance against hardened mating surfaces. Combinations of different coatings were tested and run against each other.

The galling resistant metal advantageously comprises a corrosion resistant alloy.

Good results after multiple times testing (minimum friction, maximum galling resistance) were obtained using various combinations of different coatings. Multiple times testing herein indicates, for instance, a cycle of three or more times make-up and break-up of the connections. One sample comprised Diamalloy 1008 or Hastelloy C 276 running against hybrid layers comprising thermo sprayed aluminum bronze (Metco 51 powder), then spray tungsten carbon nickel, cobalt (WOKA 3602 powder). Another sample comprised a triple layer combination comprising Inconel 625, aluminum bronze and tungsten carbide. After laser melting due to penetration of the low melting temperature, aluminum bronze alloy provided a clean surface having a relatively low friction copper film. The sample included a hard tungsten carbide layer on a fully metallurgically bonded aluminum bronze or inconel 625 layer.

Cross-sections of the pin or box members with spray coating before laser melting and after showed a tungsten carbide coating on top of an aluminum bronze coating. After laser heating, the aluminum bronze with low melting temperature spread out through the cross section of the spray coating and occurred on top of the deposited layer. The cross-section showed penetration of the copper all the way up to top of the surface of the multi-layer coating.

Another sample included three layers, for instance Inconel 625, then aluminum bronze, and then tungsten carbide on top. The combination of the different characteristics (hardness, ductility, corrosion resistance, wear resistance, friction coefficient, strength, galling resistance, etc.) enabled to tune and optimize the properties for the multi-layered, for instance tribological, coating system for use as a metal-to-metal seal area.

Multiple tribological tests indicate that good galling resistance characteristics (minimum friction coefficient and maximum scuffing load) are provided by the following coatings (applied by thermo spray followed by laser melting):

Hastelloy C 276 (Ni-15Cr-16Mo-5W-4Fe composition);
Amperit 529 (WC—Ni Mo Cr Fe 85/15 composition);
Amdry 313 (99.5% molybdenum composition);
Diamalloy 1008 (17Cr 11Mo 3Ni 3Cu 3Si 4B composition);
Hybrid coating: WOKA 3602 (WC 9Co 5Cr 1Ni composition) on top of aluminum bronze Metco 51 powder (Cu 9.5 Al 1Fe composition);
Hybrid coating: WOKA 3602 (WC 9Co 5Cr 1Ni composition) on top of Inconel 625 (Ni-22Cr-8Mo-3Nb-5Fe composition).

The testing of the different coatings indicates that very good results are obtained using combinations of Hastelloy C 276 or Diamalloy 1008 run against hybrid coatings. For instance WOKA 3602 on top of Metco 51 or Inconel 625.

The present invention may also provide a method for coating an inner surface of a pipe, in particular an OCTG (oil country tubular goods) pipe, with a hardened coating. Coating the inner surface allows the use of relatively cheap pipe, made from relatively low-cost steel, which is subsequently provided with a suitable coating layer, as described above.

Laser melting of the applied coating layer may be challenging when the entire inner surface of an OCTG pipe section has to be treated. Herein, one pipe section typically has a length in the order of 10 meters. The entire inside surface of a pipe section may be laser treated, using for instance a method or system as described in WO-2013/117754. Other suitable laser systems may for instance described in WO-2012156230, WO-201295422, WO-201232116, and WO-201276651. Any combination of these laser systems may also be used.

The present invention is not limited to the embodiments thereof as described above, wherein many modifications are conceivable within the scope of the appended claims. Features of respective embodiments may for instance be combined.

The invention claimed is:

1. A method of creating a pipe connector including a first connector member and a second connector member, said connector members being adapted to be connected and disconnected multiple times, the method comprising:
   a) providing at least one of the connector members with a contact surface;
   b) depositing particles of a galling resistant metal on each said contact surface;
   c) at least partially melting the particles of the galling resistant metal by subjecting the particles to a quantity of heat; and
   d) allowing the molten galling resistant metal to solidify thereby forming a galling resistant metal coating which is metallurgically bonded to the contact surface.

2. The method of claim 1, wherein said quantity of heat is provided in the form of radiant energy.

3. The method of claim 2, wherein said radiant energy is induced by a laser beam.

4. The method of claim 3, wherein the laser beam is a point laser beam.

5. The method of claim 3, wherein the laser beam is a linear laser beam.

6. The method of claim 3, wherein the connector member has a central longitudinal axis and the contact surface is of substantially circular cross-sectional shape, and wherein one of the connector member and the laser beam is rotated relative to the other of the connector member and the laser beam about said central longitudinal axis during step (c).

7. The method of claim 3, including the steps of:
   integrally forming said at least one connector member on an end of a pipe;
   depositing particles of said metal on an inner surface of said pipe, wherein said metal is corrosion resistant;
   at least partially melting the particles on said inner surface by subjecting the particles to a laser beam; and
   allowing the molten metal on said inner surface to solidify thereby forming a corrosion resistant metal coating on the inner surface of the pipe.

8. The method of claim 7, wherein the galling resistant metal coating on the contact surface extends continuously to the corrosion resistant metal coating on the inner surface of the pipe.

9. The method of claim 1, wherein one of the connector members is provided with said galling resistant coating;
   the method including the step of contacting a base metal of the other one of the connector members with the galling resistant coating when the connector members are interconnected.

10. The method of claim 9, wherein the connector members include a pin member and a box member, and wherein said selected connector member is the box member.

11. The method of claim 1, including the steps of:
   providing a first galling resistant coating to the first connector member;
   providing a second galling resistant coating to the second connector member; and
   interconnecting the first and second connector members, wherein the first and second coatings contact each other.

12. The method of claim 11, wherein the first galling resistant coating and the second galling resistant coating have contact surfaces which are tribologically compatible to each other.

13. The method of claim 11, wherein a first hardness of the first galling resistant coating differs from a second hardness of the second galling resistant coating.

14. The method of claim 11, wherein the first galling resistant coating comprises Inconel 625 (trade mark) and the second galling resistant coating comprises Hastelloy C 276 (trade mark).

15. The method of claim 1, including the steps of:
   providing the first connector member with a first tapering threaded surface;
   providing the second connector member with a second tapering threaded surface corresponding to the first treaded surface;
   machining an unthreaded first contact surface on the first tapering threaded surface;
   machining an unthreaded second contact surface, corresponding to the first contact surface, on the second tapering threaded surface; and providing at least one of the first contact surface and the second contact surface with the galling resistant metal coating.

16. The method of claim 15, wherein the first tapering threaded surface and the second tapering threaded surface comprise threads according to an API standard.

17. The method claim 1, wherein each coating of galling resistant metal has a positive hardness gradient in a direction from the outer surface of the coating towards the base metal of the respective connector member.

18. The method claim 1, wherein step (b) comprises depositing the galling resistant metal on the contact surface by a method selected from thermal spraying, electroplating, brushing, and dipping the contact surface into a bath of the galling resistant metal.

19. The method of claim 18, wherein said thermal spraying includes one of plasma spraying and high velocity oxy-fuel coating spraying (HVOF).

20. The method of claim 1, wherein said contact surface is formed on a sealing portion of the respective connector member, the method comprising the step of:
plastically deforming said sealing portion when the connector members are interconnected.

21. A pipe connector obtained with the method according to claim 1.

* * * * *